(12) United States Patent
Choi

(10) Patent No.: US 6,425,576 B1
(45) Date of Patent: Jul. 30, 2002

(54) SUSPENSION ARM BUSHING OF VEHICLE

(75) Inventor: Tae-Su Choi, Ansan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/751,608

(22) Filed: Dec. 26, 2000

(30) Foreign Application Priority Data

Aug. 21, 2000 (KR) .............................................. 00-48292

(51) Int. Cl.$^7$ ................................................. F16F 1/06
(52) U.S. Cl. ........................ 267/273; 267/154; 267/276
(58) Field of Search ................................ 267/273, 274, 267/276, 279, 281, 282, 283, 154, 157, 272; 280/124.169, 124.13, 124.177, 124.134, 124.137

(56) References Cited

U.S. PATENT DOCUMENTS

| | | | | |
|---|---|---|---|---|
| 2,683,033 A | * | 7/1954 | Ashburn | |
| 2,689,755 A | * | 9/1954 | Krotz | |
| 2,751,179 A | * | 6/1956 | Oravec | |
| 3,860,353 A | * | 1/1975 | Lukasik et al. | |
| 4,768,761 A | * | 9/1988 | Kramer | 267/154 |
| 5,129,799 A | * | 7/1992 | Scheldorf | 267/154 |
| 5,413,374 A | * | 5/1995 | Pierce | |
| 5,630,574 A | * | 5/1997 | Itakura | 267/155 |
| 5,839,321 A | * | 11/1998 | Siemons | |
| 6,145,858 A | * | 11/2000 | Foulquier | 280/124.13 |

* cited by examiner

Primary Examiner—Douglas C. Butler
(74) Attorney, Agent, or Firm—Christie, Parker & Hale, LLP

(57) ABSTRACT

A suspension arm busing having an outer pipe fixed to one end of a suspension arm, an inner pipe positioned within the outer pipe, and a cushion spring inserted between the outer pipe and the inner pipe and coupled to an inner surface of the outer pipe and an outer surface of the inner pipe, for absorbing external forces transmitted to the outer pipe and the inner pipe.

5 Claims, 2 Drawing Sheets

SUSPENSION ARM BUSHING OF VEHICLE

CROSS-REFERENCE TO RELATED APPLICATION

This application claims priority of Korea patent Application No. 2000-48292, filed on Aug. 21, 2000.

BACKGROUND OF THE INVENTION

1. Field of the Invention

The present invention relates to a rear wheel suspension system of a vehicle, and more particularly to a suspension arm bushing of a vehicle.

2. Description of the Prior Art

In general, a suspension system of a vehicle serves to connect an axle to a frame and to absorb shock and vibration received from road surface while the vehicle is running, thereby improving rideability and safety of the vehicle.

FIG. 1 is a perspective view for illustrating a suspension arm 10 applied to a rear wheel suspension system according to the prior art. The suspension arm 10 serves to control movement of wheels and is also called as "control arm". The suspension arm 10 is integrally coupled at one side thereof by a bushing 20 to be screwed to body or axle by way of a bolt. The suspension arm 10 can be classified into "A" arm, "I" arm and the like according to its shape. The suspension arm 10 is usually made of pressed steel plate but can also be forged.

Rubber is generally used for a bushing 20 applied to a suspension arm, and is fixed between an outer pipe 22 and an inner pipe 24 as illustrated in FIG. 1.

The suspension arm 10, like other types of suspension system, absorbs shock or vibration coming from road bed.

However, there is a problem in the suspension arm bushing thus described according to the prior art in that the bushing is controlled by hardness and quantity of rubber, resulting in deformation thereof.

SUMMARY OF THE INVENTION

The present invention is disclosed to solve the aforementioned problem and it is an object of the present invention to provide a suspension arm bushing of a vehicle adapted to complement characteristics of bushing applied to the suspension arm to thereby reduce deformation thereof.

In accordance with the object of the present invention, there is provided a suspension arm bushing, the bushing comprising:

an outer pipe fixed to one end of a suspension arm;

an inner pipe positioned within the outer pipe; and a clockwork-type cushion spring inserted between the outer pipe and the inner pipe, one end thereof being coupled to the outer pipe and another end thereof being coupled to the inner pipe, for absorbing external force transmitted to the outer pipe and the inner pipe.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows.

DETAILED DESCRIPTION OF THE INVENTION

Now, preferred embodiment of the present invention will be described in detail with reference to the accompanying drawings.

Various details such as below-mentioned description and accompanying drawings are presented for the purpose of better understanding of the present invention. They are not intended to limit the scope of this invention. Detailed description with regard to the prior arts and construction that might unnecessarily obscure the subject matter of the present invention are to be omitted.

Figure 1:
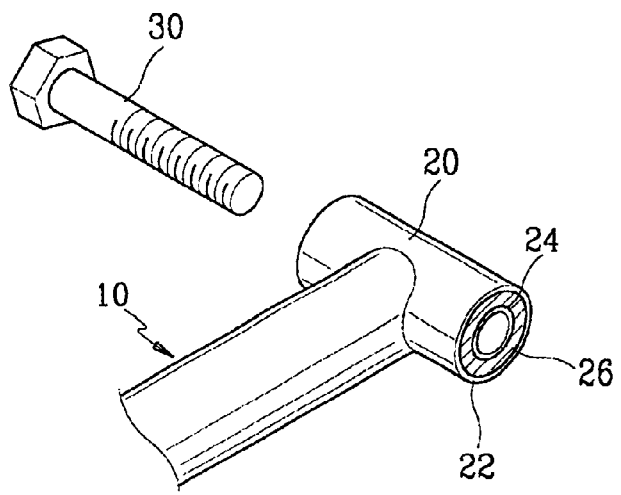
FIG. 1 is a perspective view for illustrating a suspension arm according to the prior art.
Figure 3:
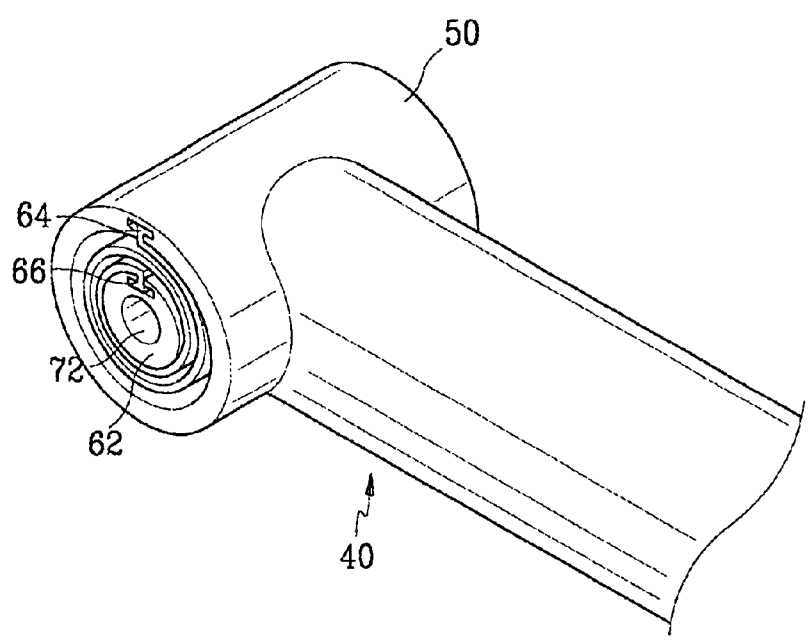
FIG. 3 is a schematic drawing for illustrating a coupled state of suspension arm bushing depicted in FIG. 2.
Figure 2:
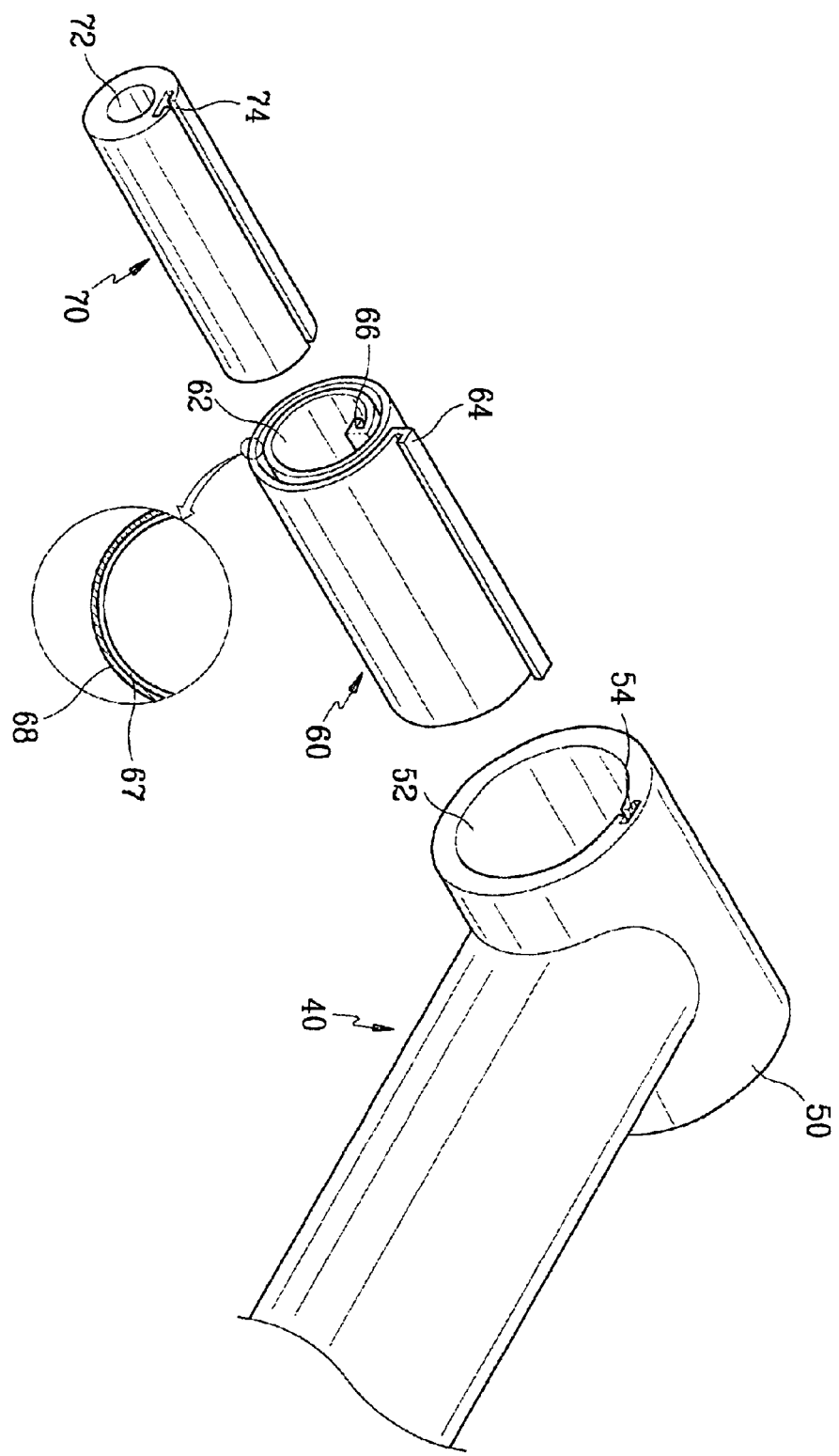
FIG. 2 is an exploded perspective view for illustrating a suspension arm bushing of a vehicle according to the present invention.

FIG. 2 is an exploded perspective view for illustrating a suspension arm bushing of a vehicle according to the present invention, and FIG. 3 is a schematic drawing for illustrating a coupled state of suspension arm bushing depicted in FIG. 2.

The present invention relates to a suspension arm 40 of a vehicle with reference to FIGS. 2 and 3. The bushing according to the embodiment of the present invention includes an outer pipe 50, an inner pipe 70 and a cushion spring 60.

First of all, the pipe 50 is fixed to one end of the suspension arm 40. The outer pipe 50 is comprised of a first key groove 54 having a predetermined shape at an upper inner surface of the outer pipe 50 along a lengthwise direction of the outer pipe 50, and a first hole 52 centrally formed at the outer pipe 50 for the cushion spring 60 to be inserted thereinto.

The inner pipe 70 is formed at an inner side of the outer pipe 50. The inner pipe 70 includes a second key groove 74 having a predetermined shape at an upper inner surface of the inner pipe 70 along a lengthwise direction of the inner pipe 70, and a third hole 72 centrally formed at the inner pipe 70 for a predetermined type of fastening bolt to be coupled thereinto.

The clockwork type cushion spring 60 absorbs external force transmitted to the outer pipe 50 and the inner pipe 70 be being inserted between the outer pipe 50 and the inner pipe 70, one end thereof being coupled to an inner surface of the outer pipe 50 and the outer end thereof being coupled to an outer surface of the inner pipe 70.

The cushion spring 60 is centrally formed with a second hole 62 through which the inner pipe 70 is inserted. The cushion spring 60 is a plate spring 67 adhered by vulcanized rubber 68 wound to a predetermined number like clockwork. The wound number may be two or three times and variably applicable according to elastic strength of the plate spring 67, kind of vehicle and design elements.

The cushion spring 60 is formed at one end thereof with a first key 64 upwardly extended from an external surface thereof to be lengthwise bent and formed at the other end thereof with a second key 66 downwardly extended from an internal surface thereof to be lengthwise bent. The first key 64 of the cushion spring 50 is insertedly coupled to the first key groove 54 of the outer pipe 50 while the second key 66 of the cushion spring 60 is inserted into and coupled to the second key groove 74 of the inner pipe 70.

The bushing thus constructed as illustrated in FIG. 3 according to the present invention is structured such that the plate spring 67 is glued to rubber 68 and wound like clockwork while key is pressingly matched to key grooves of the inner pipe 70 and the outer pipe 50.

Rotary torque and strain occurring on the suspension arm 40 while a vehicle is running is inhibited by a larger rotary torque created by the cushion spring 60 wound in the shape of clockwork to cause the bushing to have a repulsive force against deformation thereof, and horizontal deformation of bushing is coped with by the cushion spring 60 functioning as insert plate.

As apparent from the foregoing, there is an advantage in the suspension arm bushing of vehicle thus described according to the present invention in that rotary torque and strain of bushing occurring on the suspension arm while the vehicle is running is reduced to improve bushing characteristics.

What is claimed is:

1. A suspension arm bushing, the bushing comprising:
   an outer pipe fixed to one end of a suspension arm;
   an inner pipe positioned within the outer pipe; and
   a cushion spring inserted between the outer pipe and the inner pipe, one end thereof being coupled to the outer pipe and another end thereof being coupled to the inner pipe, for absorbing external force transmitted to the outer pipe and the inner pipe.

2. The bushing as defined in claim 1, wherein the outer pipe comprises a first key groove having a predetermined shape at an upper inner surface of the outer pipe along a lengthwise direction thereof, and a first hole centrally formed at the outer pipe for the cushion spring to be inserted thereinto.

3. The bushing as defined in claim 1, wherein the inner pipe includes a second key groove having a predetermined shape at an upper inner surface thereof along a lengthwise direction thereof, and a third hole centrally formed at the inner pipe for a fastening bolt to be coupled thereinto.

4. The bushing as defined in claim 2 or 3, wherein the cushion spring is a wound plate spring and centrally defines a second hole through which the inner pipe is inserted, wherein the cushion plate spring is formed at one end thereof with a first key upwardly extended from an external surface thereof and having a lengthwise bend and formed at the other end thereof with a second key downwardly extended from an internal surface thereof and having a lengthwise bend.

5. The bushing as defined in claim 4, wherein the first key of the cushion spring is inserted into the first key groove of the outer pipe while the second key of the cushion spring is inserted into the second key groove of the inner pipe.

* * * * *